US010997064B2

(12) United States Patent
Nalli et al.

(10) Patent No.: US 10,997,064 B2
(45) Date of Patent: *May 4, 2021

(54) ORDERING UPDATES FOR NONVOLATILE MEMORY ACCESSES

(71) Applicant: Hewlett Packard Enterprise Development LP, Houston, TX (US)

(72) Inventors: Sanketh Nalli, Palo Alto, CA (US); Haris Volos, Palo Alto, CA (US); Kimberly Keeton, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 29 days.

This patent is subject to a terminal disclaimer.

(21) Appl. No.: 16/453,784

(22) Filed: Jun. 26, 2019

(65) Prior Publication Data
US 2019/0317891 A1 Oct. 17, 2019

Related U.S. Application Data

(63) Continuation of application No. 15/545,901, filed as application No. PCT/US2015/013958 on Jan. 30, 2015, now Pat. No. 10,372,602.

(51) Int. Cl.
*G06F 12/02* (2006.01)
*G06F 12/0804* (2016.01)
*G06F 12/0868* (2016.01)

(52) U.S. Cl.
CPC ...... *G06F 12/0238* (2013.01); *G06F 12/0804* (2013.01); *G06F 12/0868* (2013.01); *G06F 2212/1028* (2013.01); *G06F 2212/1032* (2013.01); *G06F 2212/7203* (2013.01); *Y02D 10/00* (2018.01)

(58) Field of Classification Search
None
See application file for complete search history.

(56) References Cited

U.S. PATENT DOCUMENTS

| 5,123,099 A | 6/1992 | Shibata et al. |
| 5,276,849 A | 1/1994 | Patel |
| 6,195,727 B1 | 2/2001 | Islam et al. |

(Continued)

FOREIGN PATENT DOCUMENTS

EP  1323044 B1  5/2010

OTHER PUBLICATIONS

Volos et al., "Mnemosyne: lightweight persistent memory", ASPLOS 2011, 14 pages.

(Continued)

*Primary Examiner* — Kevin Verbrugge
(74) *Attorney, Agent, or Firm* — Sheppard Mullin Richter & Hampton LLP

(57) ABSTRACT

Examples relate to ordering updates for nonvolatile memory accesses. In some examples, a first update that is propagated from a write-through processor cache of a processor is received by a write ordering buffer, where the first update is associated with a first epoch. The first update is stored in a first buffer entry of the write ordering buffer. At this stage, a second update that is propagated from the write-through processor cache is received, where the second update is associated with a second epoch. A second buffer entry of the write ordering buffer is allocated to store the second update. The first buffer entry and the second buffer entry can then be evicted to non-volatile memory in epoch order.

18 Claims, 2 Drawing Sheets

(56) References Cited

U.S. PATENT DOCUMENTS

| | | |
|---|---|---|
| 7,408,834 B2 | 8/2008 | Conley et al. |
| 8,019,943 B2 | 9/2011 | Yu et al. |
| 8,046,548 B1 | 10/2011 | Chatterjee et al. |
| 2005/0195635 A1 | 9/2005 | Conley et al. |
| 2008/0256294 A1 | 10/2008 | Gill |
| 2012/0254507 A1 | 10/2012 | Chang et al. |
| 2014/0068144 A1 | 3/2014 | Fai |
| 2014/0115241 A1 | 4/2014 | Wei |

OTHER PUBLICATIONS

Nightingale ett al., "Cycles, Cells and Platters: An Empirical Analysis of Hardware Failures on a Million Consumer PCs", EuroSys '11 Proceedings of the sixth conference on Computer systems, 2011, 14 pages.

Narayanan et al., "Whole-system persistence", ASPLOS XVII Proceedings of the seventeenth international conference on Architectural Support for Programming Languages and Operating Systems, 2012, 10 pages.

Kumud Bhandari, "Implications of CPU Caching on Byte-addressable Non-Volatile Memory Programming," HP Laboratories, HPL-2012-236, Dec. 6, 2012, 7 pps <http://www.hpl.hp.com/techreports/2012/HPL-2012-236.pdf>.

Jeremy Condit et al, Better I/O Through Byte-Addressable, Persistent Memory, SOSP 2009, 14 Pgs.

International Search Report and Written Opinion received for PCT Application No. PCT/US2015/013958, dated Oct. 22, 2015, 10 pages.

Ellis Giles Bridging tile Programming Gap Between Persistent and Volatile Memory Using WrAP, May 14-16, 2013, 10 Pgs., <http://www.ece.rice.edu/~pjv/frontiers2013.pdf>.

Dulloor et al., "System software for persistent memory", EuroSys '14 Proceedings of the Ninth European Conference on Computer Systems Article No. 15, 2014, 15 pages.

Cao et al., "Cost-aware WWW proxy caching algorithms", USITS'97 Proceedings of the USENIX Symposium on Internet Technologies and Systems on USENIX Symposium on Internet Technologies and Systems, 1997, 14 pages.

ORDERING UPDATES FOR NONVOLATILE MEMORY ACCESSES

BACKGROUND

Byte-addressable non-volatile memory (NVM) technologies, such as memristor, provide persistent data storage that can be accessed directly through processor load and store instructions. Processors can employ fast on-chip caches to hide the latency to access the NVM, which may reorder updates to NVM and complicate the implementation of crash-consistency protocols. In this case, augmenting write-back caches with ordering mechanisms or explicitly flushing cache lines can be used to ensure crash-consistency.

BRIEF DESCRIPTION OF THE DRAWINGS

The following detailed description references the drawings, wherein.

DETAILED DESCRIPTION

As detailed above, augmenting write-back caches with ordering mechanisms or explicitly flushing cache lines can be used to ensure crash-consistency. Write-through caching offers an alternative to write-back caching that may be less complicated to implement. With write-through caching, writes appear to NVM in program order, which removes the need for explicitly flushing dirty cache lines to NVM and simplifies the implementation of crash-consistent updates. However, write-through caching may have a performance impact on write-intensive workloads as each write suffers from the latency to NVM.

Examples described herein instead add a small write ordering buffer (WOB) between a write-through processor cache and NVM. The WOB can help improve the cache hit ratio of common file system workloads by exploiting spatial locality that is common in these workloads. Orthogonal to the WOB, extensions to the LRU cache replacement policy can also be used for properly sharing the cache space between the processor cache and the NVM.

In some examples, a first update that is propagated from a write-through processor cache of a processor is received by a write ordering buffer, where the first update is associated with a first epoch. The first update is stored in a first buffer entry of the write ordering buffer. At this stage, a second update that is propagated from the write-through processor cache is received, where the second update is associated with a second epoch. A second buffer entry of the write ordering buffer is allocated to store the second update. The first buffer entry and the second buffer entry can then be evicted to non-volatile memory in epoch order. In this example, the epoch of buffer entries determine the order in which the buffer entries are evicted. For example, epoch order may correspond to a first in first out order that ensures updates are evicted in the proper order.

Figure 1:
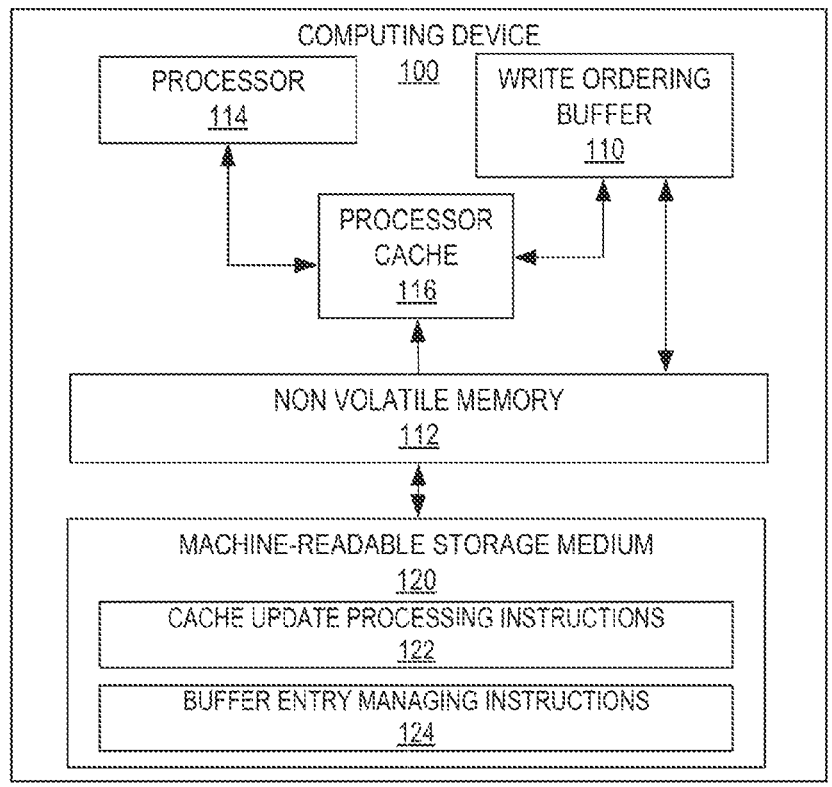
FIG. 1 is a block diagram of an example computing device for ordering updates for nonvolatile memory accesses.

Referring now to the drawings, FIG. 1 is a block diagram of an example computing device 100 for ordering updates for nonvolatile memory accesses. Computing device 100 may be any computing device (e.g., server, desktop computer, etc.) that is capable of the functionality described below. In FIG. 1, computing device 100 includes a write ordering buffer (WOB) 110, non-volatile memory (NVM) 112, a processor 114, processor cache 116, and a machine-readable storage medium 120.

NVM 112 is memory that is capable of storing information even when not powered. Examples of NVM include read-only memory (ROM), flash memory, byte-addressable NVM, phase change memory, spin torque transfer memory, etc.

WOB 110 is an intermediate buffer between NVM 112 and processor cache 116. WOB 110 comprises a number of buffer entries with each entry having a size equal to the cache line size of processor cache 116. Write ordering may be expressed in WOB 110 by grouping sequences of writes into epochs. WOB 110 may be implemented as a first in first out (FIFO) buffer that evicts cache lines in epoch order.

Processor 114 may be one or more central processing units (CPUs), microprocessors, and/or other hardware devices suitable for execution of instructions stored in machine-readable storage medium 120. Processor 114 may fetch, decode, and execute instructions 122, 124 to enable ordering updates for nonvolatile memory accesses, as described below. As an alternative or in addition to retrieving and executing instructions, processor 114 may include one or more electronic circuits comprising a number of electronic components for performing the functionality of one or more of instructions 122, 124.

Processor cache 116 is used by processor 114 to reduce access times for data from NVM 112. Processor cache 116 is usually smaller and faster than NVM 112. In some cases, processor cache 116 is a write-through cache that implements a no-allocate write policy, which allocates a cache line only on a cache read miss.

Machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a hard disk, a solid-state drive (SSD), an optical disc, and the like. As described in detail below, machine-readable storage medium 120 may be encoded with executable instructions for ordering updates for nonvolatile memory accesses.

Cache update processing instructions 122 propagates updates to processor cache 116 and WOB 110. Each update may be associated with an epoch, which describes the order that the updates should be committed to NVM 112. For each update, cache updating processing instructions 122 determines if a buffer entry associated with the epoch exists in WOB 110. If the buffer entry for the epoch already exists, the corresponding update can be coalesced into the buffer entry. If the buffer entry for the epoch does not exist, a buffer entry for the epoch can be created so that the corresponding update can be propagated to the new buffer entry.

Buffer entry managing instructions 124 manages the eviction of buffer entries. Specifically, buffer entry managing instructions 124 evicts the buffer entries of write ordering buffer 110 in epoch order. Buffer entries can be evicted when space is needed for new buffer entries. In this case, older buffer entries with respect to epoch order is evicted first. Because the write ordering buffer 110 is evicted in epoch order, the integrity of NVM 112 is maintained such that if there is a power failure, data consistency metadata properly reflect the state of data in NVM 112. Data consistency metadata, such as but not limited to validity flags, should be set after updates are committed to NVM 112, so if there is a failure, NVM 112 can be restored to a consistent state based on the validity flags.

Figure 2:
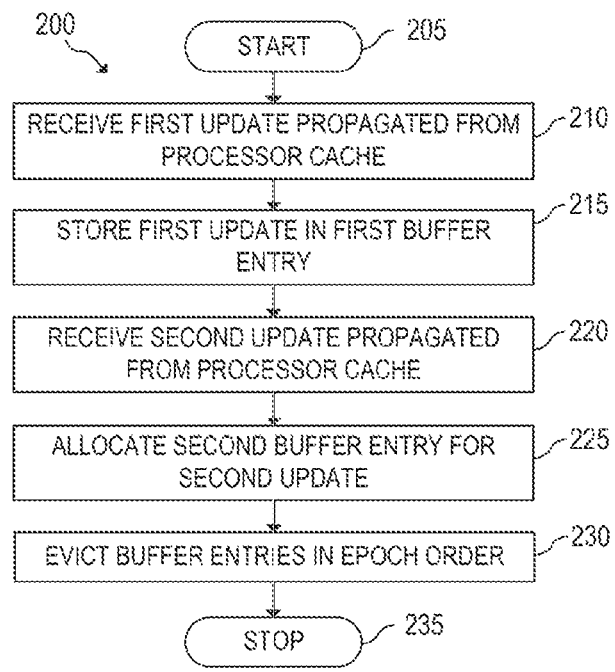
FIG. 2 is a flowchart of an example method for execution by a computing device for ordering updates for nonvolatile memory accesses.

FIG. 2 is a flowchart of an example method 200 for execution by computing device 100 for ordering updates for nonvolatile memory accesses. Although execution of method 200 is described below with reference to computing device 100 of FIG. 1, other suitable devices for execution of method 200 may be used. Method 200 may be implemented in the form of executable instructions stored on a machine-readable storage medium, such as storage medium 120, and/or in the form of electronic circuitry.

Method 200 may start in block 205 and continue to block 210, where computing device 100 propagates a first update of the processor cache to a write ordering buffer. In other words, as updates hit the processor cache, the updates are also propagated to the write ordering buffer. In block 215, computing device 100 stores the first update in a first buffer entry of the write ordering buffer. The first update is associated with a first epoch number, and the first buffer entry that is associated with the first epoch number can be created to store the first update.

In block 220, computing device 100 propagates a second update of the processor cache to the write ordering buffer. In block 225, computing device 100 allocates a second buffer entry of the write ordering buffer for the second update. The second update is associated with a second epoch number, and because a buffer entry that is associated with the second epoch number does not exist, the second update is propagated into the newly created second buffer.

In block 230, computing device 100 evicts the write ordering buffer in epoch order. In other words, the write buffers are evicted in a FIFO order so that the integrity of NVM is maintained. Method 200 may then continue to block 235, where method 200 may stop.

Figure 3:
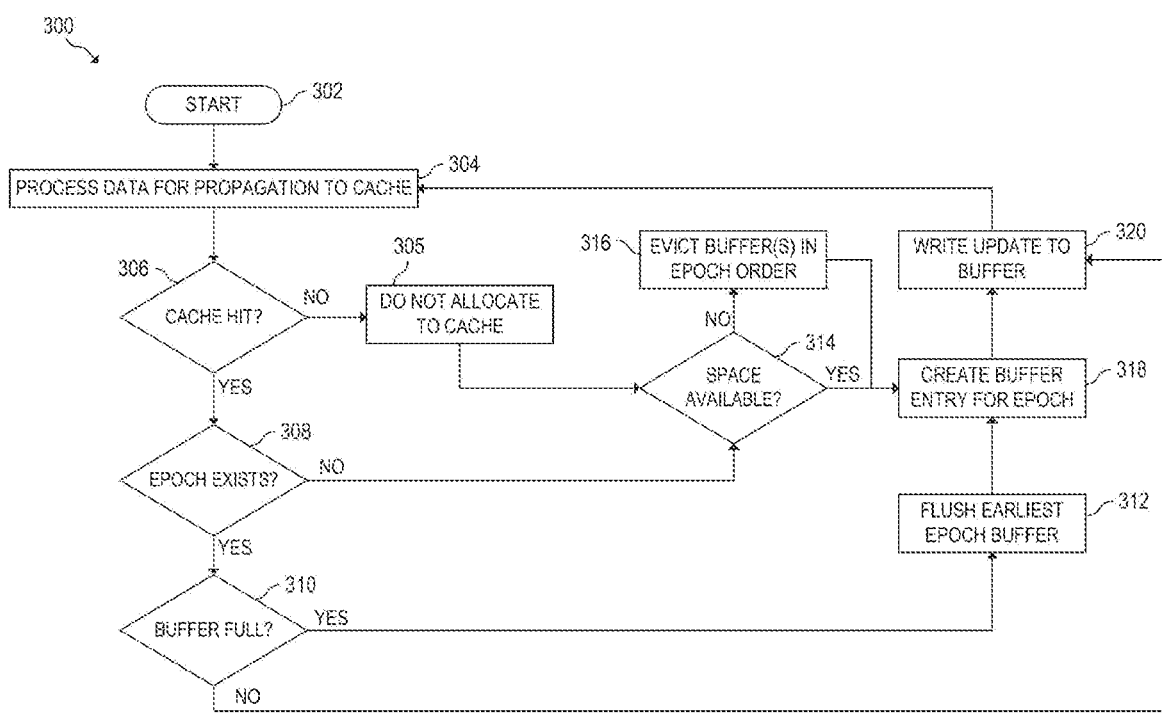
FIG. 3 is a flowchart of an example method for execution by a computing device for processing ordered updates and read operations in nonvolatile memory accesses.

FIG. 3 is a flowchart of an example method 300 for execution by computing device 100 for processing ordered updates in nonvolatile memory accesses. Read operations may be handled by a different mechanism such as the one shown below in the pseudocode for the nvram_load function. Although execution of method 300 is described below with reference to computing device 100 of FIG. 1, other suitable devices for execution of method 300 may be used. Method 300 may be implemented in the form of executable instructions stored on a machine-readable storage medium and/or in the form of electronic circuitry.

Method 300 may start in block 302 and proceed to block 304, where computing device 100 processes data for propagation to the processor cache and a write ordering buffer. In block 306, it is determined if each logical portion of data is a cache hit. If a portion is a write miss, then a cache line entry is not created in the processor cache in block 305 but only in the write ordering buffer as described below with respect to blocks 314-320. Method 300 can then return to block 304 to process further data for propagation.

If a portion is a cache hit, then it is determined whether a buffer entry for the corresponding epoch of the cache update exists in block 308. Each buffer entry may have a dirty bit that can be used to specify whether the corresponding buffer entry is dirty. In some cases, each buffer entry can include multiple dirty bits that specify whether subsets (e.g., each byte of word of the buffer entry can have a dirty bit, etc.) of the buffer entry are dirty. The dirty bits allow the write ordering buffer to act as a coalescing buffer that is capable of coalescing cache updates to a preexisting buffer entry. If a buffer entry for the corresponding epoch does exists, computing device 100 determines if the write ordering buffer has space for the cache update in block 310. If the write ordering buffer has space, computing device 100 writes the cache update to the buffer entry of the corresponding epoch in block 320. If the write ordering buffer does not have space, computing device 100 flushes the buffer entry of the earliest epoch (assuming FIFO order) in block 312. As described above, the buffer entry is evicted in epoch order. Then, in block 318, a new buffer entry for the corresponding epoch can be created before method 300 proceeds to block 320, where computing device 100 writes the cache update to the new buffer entry for the corresponding epoch.

If a buffer entry for the corresponding epoch does not exist, computing device 100 determines if there is sufficient space to allocate a new buffer entry for the corresponding epoch in block 314. If space is available, method 300 proceeds to block 318 to create a new buffer entry for the corresponding epoch. If space is not available, computing device 100 evicts the buffer entries of the write ordering buffer in epoch order to free space in block 316. At this stage, method 300 proceeds to block 318 to allocate a new buffer entry for the corresponding epoch.

In this manner, the eviction of cache updates in the processor cache are managed by the write ordering buffer so that the integrity of NVM is maintained. Pseudo code for implementing an example of method 300 is shown below:

```
nvram_store(addr, val):
    IF addr in cache: // cache write hit -- no-allocate policy
        c = cache.cache_line_index(addr)
        cache[c] = val
    IF addr in WOB:
        i = WOB.location(addr)
        IF WOB.epoch(addr) == WOB.cur_epoch:
            WOB[i] |= val // coalesce write
        ELSE:
            // an older epoch includes the memory location addr
            // allocate a new entry at the tail
            IF WOB.full( ):
                flush WOB.head
                WOB.head = WOB.head + 1 MOD WOB.size
            WOB.tail = WOB.tail + 1 MOD WOB.size
            WOB[WOB.tail] = val
            WOB[WOB.tail].epoch = WOB.cur_epoch
    ELSE:
        // memory address does not exist in WOB
        IF WOB.full( ):
            flush WOB.head
            WOB.head = WOB.head + 1 MOD WOB.size
        WOB.tail = WOB.tail + 1 MOD WOB.size
        WOB[WOB.tail] = val
        WOB[WOB.tail].epoch = WOB.cur_epoch
nvram_load(addr):
    IF addr in cache:
        return cache.value(addr)
    ELSE:
        c = cache.allocate_cache_line
        IF addr in WOB:
            cache[c] = WOB.read(addr)
        ELSE:
            cache[c] = NVRAM.read(addr)
evict_head( ):
    // flush head
    WOB.tail = next_buffer(WOB.tail)
```

In this example, the nvram_store function is configured to store cache updates to the write ordering buffer; the nvram_load function is configured to retrieve data from cache, write ordering buffer, or NVM; and the evict_head is configured to evict the write ordering buffer in a FIFO (i.e., epoch) order.

During operation of the processor of computing device 100, a read that misses in the processor cache should bring the most recent version of the corresponding cache line into the processor cache. The processor cache initially checks whether the write ordering buffer contains the most recent version before reading it from NVM. If the cache needs space to store the newly read cache line, then it selects a victim cache line based on a least recently used (LRU) or other replacement policy and evicts the cache line. As cache lines are always clean because the write ordering buffer ensures updates are committed in epoch order, the processor cache does not need to write back the victim cache line.

The foregoing disclosure describes a number of examples for ordering updates for nonvolatile memory accesses of a computing device. In this manner, the examples disclosed herein ensure the validity of NVM is maintained by using a write ordering buffer that is between the processor cache and NVM to evict memory updates in epoch order.

We claim:

1. A system for processing ordered updates in nonvolatile memory access, the system comprising:
   a processor;
   a processor cache that is operatively connected to the processor;
   a non-volatile memory;
   a write ordering buffer that is operatively connected to the processor and the non-volatile memory;
   wherein the processor is configured to:
      receive data for propagation to the processor cache and the write ordering buffer;
      determine if each logical portion of data is a cache hit;
      in response to determining a portion of data is a cache hit, determine if a buffer entry for an epoch corresponding to the data determined to be a cache hit exists in the write ordering buffer;
      in response to determining a portion of data is a write miss, determine if the write ordering buffer has space for a new buffer entry for an epoch corresponding to the data determined to be a write miss;
      in response to determining the write ordering buffer has space for the new buffer entry, create the new buffer entry for the epoch corresponding to the data determined to be a write miss; and
      write a cache update to the new buffer entry.

2. The system of claim 1, wherein, in response to determining a portion of data is a write miss, the processor is further configured to not create a new cache line entry in the processor cache.

3. The system of claim 1, wherein the new buffer entry comprises a size equivalent to a size of a cache line of the processor cache.

4. The system of claim 1, the processor further configured to:
   in response to determining a buffer entry for the epoch corresponding to the data does not exist, determine if the write ordering buffer has space for a new buffer entry for the epoch corresponding to the data;
   in response to determining the write ordering buffer has space for the new buffer entry, create the new buffer entry for the epoch corresponding to the data; and
   write a cache update to the new buffer entry.

5. The system of claim 1, the processor further configured to:
   in response to determining a buffer entry for the epoch corresponding to the data does exist, determine if the write ordering buffer has space for a new buffer entry for the epoch corresponding to the data;
   in response to determining the write ordering buffer has space for the new buffer entry, create the new buffer entry for the epoch corresponding to the data; and
   write a cache update to the new buffer entry.

6. The system of claim 1, each buffer entry of a plurality of buffer entries of the write ordering buffer comprising at least one dirty bit.

7. The system of claim 6, wherein the dirty bit specifies that a subset of a buffer entry is dirty, and wherein the subset is a byte or word of the buffer entry.

8. The system of claim 1, wherein the processor cache implements a no-allocate write policy.

9. A method for processing ordered updates in nonvolatile memory access, the method comprising:
   receiving, by a processor, data for propagation to a processor cache and a write ordering buffer;
   determining if each logical portion of data is a cache hit;
   in response to determining a portion of data is a cache hit, determining if a buffer entry for an epoch corresponding to the data determined to be a cache hit exists in the write ordering buffer;
   in response to determining a portion of data is a write miss, determining if the write ordering buffer has space for a new buffer entry for an epoch corresponding to the data determined to be a write miss;
   in response to determining the write ordering buffer has space for the new buffer entry, creating the new buffer entry for the epoch corresponding to the data determined to be a write miss; and
   writing a cache update to the new buffer entry.

10. The method of claim 9, wherein, in response to determining a portion of data is a write miss, creating a new cache line entry in the processor cache.

11. The method of claim 9, wherein the new buffer entry comprises a size equivalent to a size of a cache line of the processor cache.

12. The method of claim 9, further comprising:
    in response to determining a buffer entry for the epoch corresponding to the data does not exist, determining if the write ordering buffer has space for a new buffer entry for the epoch corresponding to the data;
    in response to determining the write ordering buffer has space for the new buffer entry, creating the new buffer entry for the epoch corresponding to the data; and
    writing a cache update to the new buffer entry.

13. The method of claim 9, further comprising:
    in response to determining a buffer entry for the epoch corresponding to the data does exist, determining if the write ordering buffer has space for a new buffer entry for the epoch corresponding to the data;
    in response to determining the write ordering buffer has space for the new buffer entry, creating the new buffer entry for the epoch corresponding to the data; and
    writing a cache update to the new buffer entry.

14. The method of claim 9, each buffer entry of a plurality of buffer entries of the write ordering buffer comprising at least one dirty bit.

15. The method of claim 14, wherein the dirty bit specifies that a subset of a buffer entry is dirty, and wherein the subset is a byte or word of the buffer entry.

16. The method of claim 9, wherein the processor cache is a write-through processor cache and implements a no-allocate write policy.

17. A non-transitory machine-readable storage medium encoded with instructions executable by a processor for processing ordered updates in nonvolatile memory access, the machine-readable storage medium comprising instructions to:

receive data for propagation to a processor cache and a write ordering buffer;

determine if each logical portion of data is a cache hit;

in response to determining a portion of data is a cache hit, determine if a buffer entry for an epoch corresponding to the data determined to be a cache hit exists in the write ordering buffer;

in response to determining a portion of data is a write miss, determine if the write ordering buffer has space for a new buffer entry for an epoch corresponding to the data determined to be a write miss;

in response to determining the write ordering buffer has space for the new buffer entry, create the new buffer entry for the epoch corresponding to the data determined to be a write miss; and write a cache update to the new buffer entry.

18. The non-transitory machine-readable storage medium of claim 17, the machine-readable storage medium further comprising instructions to:

in response to determining a buffer entry for the epoch corresponding to the data does not exist, determine if the write ordering buffer has space for a new buffer entry for the epoch corresponding to the data;

in response to determining the write ordering buffer has space for the new buffer entry, create the new buffer entry for the epoch corresponding to the data; and write a cache update to the new buffer entry.

\* \* \* \* \*